United States Patent [19]

Chianelli et al.

[11] Patent Number: 4,748,142

[45] Date of Patent: * May 31, 1988

[54] SUPPORTED CHROMIUM-MOLYBDENUM AND TUNGSTEN SULFIDE CATALYSTS

[75] Inventors: Russell R. Chianelli, Somerville; Teh C. Ho, Bridgewater; Allan J. Jacobson, Princeton; Archie R. Young, Montclair, all of N.J.

[73] Assignee: Exxon Research and Engineering Company, Florham Park, N.J.

[ * ] Notice: The portion of the term of this patent subsequent to Dec. 29, 2004 has been disclaimed.

[21] Appl. No.: 909,188

[22] Filed: Sep. 19, 1986

Related U.S. Application Data

[62] Division of Ser. No. 656,090, Sep. 28, 1984, Pat. No. 4,626,339.

[51] Int. Cl.$^4$ ............... B01J 27/051; B01J 27/049; B01J 27/047; B01J 31/18

[52] U.S. Cl. .................................. 502/220; 502/167; 502/219; 502/221

[58] Field of Search ................. 502/167, 154, 219–221

[56] References Cited

U.S. PATENT DOCUMENTS

| | | | |
|---|---|---|---|
| 3,046,218 | 7/1962 | Henke et al. | 502/219 |
| 3,265,615 | 8/1966 | Russ | 208/254 H |
| 3,920,756 | 11/1975 | Tahara et al. | 502/167 |
| 4,041,225 | 8/1977 | Pullukat | 502/167 |
| 4,069,242 | 1/1978 | Gurgiulo | 502/167 |
| 4,096,093 | 6/1978 | Hwang | 502/167 |
| 4,539,306 | 9/1985 | Chang | 502/154 |
| 4,612,301 | 9/1986 | Currie et al. | 502/154 |
| 4,622,128 | 11/1986 | Young et al. | 502/219 |
| 4,626,339 | 12/1986 | Chianelli et al. | 502/219 |

*Primary Examiner*—Paul E. Konopka
*Attorney, Agent, or Firm*—Edward M. Corcoran; Joseph J. Dvorak

[57] ABSTRACT

Supported hydroprocessing catalysts comprising a sulfide of trivalent chromium and molybdenum or tungsten which optionally may contain one or more promoter metals such as Co, Fe, Ni and mixture thereof. These catalysts are obtained by compositing a preselected quantity of support material with a precursor salt containing a tetrathiometallate anion of Mo or W and a cation comprising trivalent chromium and, optionally, one or more promoter metals wherein both said trivalent chromium and promoter metal are chelated by at least one neutral, nitrogen-containing polydentate ligand and heating the composite in the presence of sulfur and hydrogen in an oxygen-free atmosphere. These catalysts have high selectivity for nitrogen removal. The chromium and promoter metal do not have to be in the same cation.

17 Claims, No Drawings

SUPPORTED CHROMIUM-MOLYBDENUM AND TUNGSTEN SULFIDE CATALYSTS

This is a division of application Ser. No. 656,090, filed 9/28/84, now U.S. Pat. No. 4,626,339.

BACKGROUND OF THE INVENTION

1. Field of the Invention

This invention relates to a process for the preparation of supported, chromium-containing molybdenum and/or tungsten sulfide catalysts, the supported species prepared by such process, and to the use of such supported catalysts for hydroprocessing processes, particularly hydrotreating. More particularly, this invention relates to the preparation and use of supported catalysts useful for hydroprocessing processes such as hydrotreating wherein said catalysts are formed by heating, at elevated temperature, in the presence of sulfur and under oxygen-free conditions, a composite of a support material and one or more precursor compounds selected from the group consisting of $(Cr_{1-z}M_zLX_y)(MoS_4)_n$, $(Cr_{1-z}M_zLX_y)(WS_4)_n$ and mixture thereof wherein the chromium is in the trivalent state, wherein $n=(3-z-y)/2$, wherein M is one or more divalent promoter metals selected from the group consisting of Mn, Fe, Co, Ni, Cu, Zn and mixtures thereof, wherein $1 > z \geq 0$ and $1-z \geq y \geq 0$, wherein L is one or more neutral nitrogen-containing ligands, at least one of which is a chelating polydentate ligand, and wherein X is a singly charged anionic ligand.

2. Background of the Disclosure

The petroleum industry is increasingly turning to heavy crudes, resids, coal and tar sands as sources for future feedstocks. Feedstocks derived from these heavy materials contain more sulfur and nitrogen than feedstocks derived from more conventional crude oils. These feeds therefore require a considerable amount of upgrading in order to obtain usable products therefrom, such upgrading or refining generally being accomplished by hydrotreating processes which are well-known in the petroleum industry.

These processes require the treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrotreating relatively light feeds, the feeds are treated with hydrogen, often to improve odor, color, stability, combustion characteristics and the like. Unsaturated hydrocarbons are hydrogenated. Sulfur and nitrogen are removed in such treatments. In the hydrodesulfurization (HDS) of heavier feedstocks, or residua, the sulfur compounds are hydrogenated and cracked. Carbon-sulfur bonds are broken, and the sulfur for the most part is converted to hydrogen sulfide which is removed as a gas from the process. Hydrodenitrogenation (HDN), to some degree also generally accompanies hydrodesulfurization reactions. In the hydrodenitrogenation of heavier feedstocks, or residua, the nitrogen compounds are hydrogenated and cracked. Carbon-nitrogen bonds are broken, and the nitrogen is converted to ammonia and evolved from the process. Hydrodesulfurization, to some degree also generally accompanies hydrodenitrogenation reactions. In the hydrodesulfurization of relatively heavy feedstocks, emphasis is on the removal of sulfur from the feedstock. In the hydrodenitrogenation of relatively heavy feedstocks emphasis is on the removal of nitrogen from the feedstock. Albeit, although hydrodesulfurization and hydrodenitrogenation reactions generally occur together, it is usually far more difficult to achieve effective hydrodenitrogenation of feedstocks than hydrodesulfurization of feedstocks.

Catalyst precursors most commonly used for these hydrotreating reactions include materials such as cobalt molybdate on alumina, nickel molybdate on alumina, cobalt molybdate promoted with nickel, nickel tungstate, etc. Also, it is well-known to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oils. U.S. Pat. No. 2,715,603, discloses the use of molybdenum sulfide as a catalyst for the hydrogenation of heavy oils. Molybdenum and tungsten sulfides have other uses as catalysts in reactions such as hydrogenation, methanation, and water gas shift.

In general, with molybdenum and other transition metal sulfide catalysts as well as with other types of catalysts, higher catalyst surface areas result in more active catalysts than similar catalysts with lower surface areas. Thus, those skilled in the art are constantly trying to achieve catalysts that have higher surface areas. More recently, it has been disclosed in U.S. Pat. Nos. 4,243,553 and 4,243,554 that molybdenum sulfide catalyts of relatively high surface area may be obtained by thermally decomposing selected thiomolybdate salts at temperatures ranging from 300°–800° C. in the presence of essentially oxygen-free atmospheres. Suitable atmospheres are disclosed as consisting of argon, vacuum, nitrogen and hydrogen. In U.S. Pat. No. 4,243,554 an ammonium thiomolybdate salt is decomposed by raising the temperature at a rate in excess of 15° C. per minute, whereas in U.S. Pat. No. 4,243,553, a substituted ammonium thiomolybdate salt is thermally decomposed at a very slow heating rate of from about 0.5° to 2° C./min. The processes disclosed in these patents are claimed to produce molybdenum disulfide catalysts having superior properties for water gas shift and methanation reactions and for catalyzed hydrogenation or hydrotreating reactions.

Catalysts comprising molybdenum sulfide in combination with other metal sulfides are also known. Thus, U.S. Pat. No. 2,891,003 discloses an iron-chromium combination for desulfurizing olefinic gasoline fractions; U.S. Pat. No. 3,116,234 discloses Cr—Mo and also Mo with Fe and/or Cr and/or Ni for HDS; U.S. Pat. No. 3,265,615 discloses Cr—Mo for HDN and HDS; U.S. Pat. No. 3,245,903 discloses Fe—Mo and Fe—Co—Mo for lube oil refining; U.S. Pat. No. 3,459,656 discloses Ni—Co—Mo for HDS; U.S. Pat.

No. 4,108,761 discloses Fe—Ni—Mo for HDN and U.S. Pat. No. 4,171,258 discloses Fe—Cr—Mo for HDS with steam.

SUMMARY OF THE INVENTION

This invention relates to a process for the preparation of supported, chromium-containing molybdenum and/or tungsten sulfide catalysts, the supported species prepared by such process, and to the use of such supported catalysts for hydroprocessing processes, particularly hydrotreating. More particularly, this invention relates to the preparation and use of supported catalysts useful for hydroprocessing processes such as hydrotreating wherein said catalysts are formed by heating, at elevated temperature, in the presence of sulfur and under oxygen-free conditions, a composite of a support material and one or more precursor compounds selected from the group consisting of $(Cr_{1-z}M_zLX_y)(MoS_4)_n$, $(Cr_{1-z}M_zLX_y)(WS_4)_n$ and mixture thereof wherein the chromium is in the trivalent state, wherein $n=(3-z-y)/2$, wherein M is one or more divalent promoter metals selected from the group consisting of Mn, Fe, Co, Ni, Cu, Zn and mixtures thereof, wherein $1>Z\geq 0$ and $1-z\geq y\geq 0$, wherein L is one or more neutral nitrogen-containing ligands, at least one of which is a chelating polydentate ligand, and wherein X is a singly charged anionic ligand.

By way of illustrative, but non-limiting examples, the compositions of this invention can comprise a supported sulfide of two metals such as Mo and trivalent chromium. In another embodiment the compositions of this invention can comprise supported sulfide of three metals such as Mo, trivalent chromium and a promoter metal such as Ni. Thus, the supported sulfide of this invention may or may not contain one or more promoter metals, but it must contain trivalent chromium and Mo, W or mixture thereof. Preferably the additional metal, if present, will be selected from the group consisting of Fe, Ni, Co, Mn and mixtures thereof.

In a particularly preferred embodiment ligand L will be three bidentate or two tridentate chelating amines and the oxygen-free conditions will be an atmosphere comprising a mixture of hydrogen and hydrogen sulfide. It is also preferred that the support material comprise a suitable inorganic refractory oxide.

In the embodiment where the promoter metal consists of iron, a composition of this invention can also be obtained by heating, under oxygen-free conditions (and preferably in the presence of excess sulfur) at a temperature of at least about 200° C. for a time sufficient to form said catalyst, a composite of inorganic refractory oxide support material and a mixture of (i) a hydrated oxide of trivalent chromium and (ii) a thiometallate salt of the general formula $FeL(MoS_4)$, $FeL(WS_4)$ and mixture thereof, wherein L is as defined above. Again, in a preferred embodiment, ligand L will be three bidentate or two tridentate chelating amines and the oxygen-free conditions will be an atmosphere comprising a mixture of hydrogen and hydrogen sulfide.

Hydroprocessing catalyst is meant to include catalysts useful for any process that is carried out in the presence of hydrogen, including, but not limited to, hydrocracking, hydrodenitrogenation, hydrodesulfurization, hydrogenation of aromatic and aliphatic unsaturated hydrocarbons, methanation, water gas shift etc. These reactions include hydrotreating and hydrorefining reactions, the difference generally being thought of as more of a difference in degree than in kind, with hydrotreating conditions being more severe than hydrorefining conditions. Some of the catalysts of this invention have been found to have hydrotreating or hydrorefining activities substantially greater than that of catalysts derived from conventional hydrotreating catalyst precursors such as cobalt molybdate on alumina, even though their surface areas are not as high.

DETAILED DESCRIPTION OF THE INVENTION

The precise nature and composition of the catalyst species that is formed as a result of heating the composite of precursor and support material in the presence of sulfur and under oxygen-free conditions is not known. The composition of the corresponding unsupported catalyst species is defined in U.S. patent application Ser. No. 656,144 jointly filed by A. J. Jacobson, T. C. Ho, R. R. Chianelli, J. J. Steger and A. A. Montagna on even date herewith. Unlike applicants' species, however, the catalyst species of Jacobson et al. are unsupported, bulk catalysts. They thus differ from the supported catalyst species defined herein. The catalyst species of this invention achieve superior utilization of the catalytic material.

The bulk, unsupported catalyst species defined in co-pending Ser. No. 656,144 are unique in that they exist as a single phase of amorphous metal sulfide. These compositions comprise a non-crystalline amorphous metal sulfide phase of trivalent chromium with Mo and/or W. As stated above, these compositions may also contain one or more promoter metals selected from the group consisting of Fe, Ni, Co, Mn Mn, Cu, Zn and mixtures thereof, preferably Fe, Ni, Co, Mn and mixtures thereof. Thus, by way of illustrative, but non-limiting examples, these bulk, unsupported compositions include a single phase, amorphous, metal sulfide of (i) trivalent chromium and Mo; of (ii) trivalent chromium, Mo and divalent Ni; (iii) of trivalent chromium, W, Mo, and Ni and Fe, etc.

By amorphous is meant a compound which exhibits no detectable crystallinity when measured by X-ray diffraction (XRD), an analytical technique well-known to those skilled in the art. Thus, bulk unsupported species analyzed by XRD have exhibited no detectable crystallinity. Further, bulk, unsupported species analyzed by high resolution scanning transmission electron microscopy (HREM) with a microscope having a 4 Å point-to-point resolution revealed the absence of any crystalline material 15 Å or more in the largest dimension, 15 Å being about the limit of detectability with such an instrument.

In one method of preparing the catalyst species of this invention, a slurry of precursor salt, or mixture of salts, is incorporated with a preselected quantity of refractory inorganic oxide support material, preferably a particulate mass of said support, with the salt-containing support or composite of salt and support then dried. The dried composite of salt and support is then heated in an oxygen-free atmosphere in the presence of sulfur or sulfur-bearing compound at elevated temperature to form the catalyst species of this invention. A sufficient amounts of the salt, or salts, is composited with the support so that prior to, or at the time that the composite of support and precursor salt or salts is heated in the presence of sulfur and hydrogen and under oxygen-free conditions, generally from about 10 weight percent to about 25 weight percent of the salt, expressed as weight of $MoO_3$ or $WO_3$ on an ignition loss free basis, will be present on the support. The supported catalyst species of this invention are suitable, highly active and selective as hydrotreating catalysts.

The catalyst support will typically be a particulate, porous inorganic refractory oxide in the form of beads, pills, pellets, sieved particles, extrudates, or the like in dry or solvated state which is contacted with a slurry of precursor. Alternatively, the supported catalyst species of this invention are formed by forming the precursor in the presence of a slurry of colloidal or non-colloidal particles of support material. Typical support materials include alumina, diatomaceous earth, zeolite, silica, activated carbon, magnesia, zirconia, boria, chromia, titania and the like. A preferred support for the practice of the present invention is one having a surface area of more than 50 m$^2$/g, preferably from about 100 to 300 m$^2$/g.

A preferred method for preparing the composite of precursor salt and support that forms the catalyst precursor of this invention is to prepare the precursor salt in the presence of a colloidal or non-colloidal slurry of particles of support material. Thus, the catalyst precursor composite may be formed by contacting, in the presence of an aqueous slurry of particles of support material, one or more thiometallate salts of Mo, W or mixture thereof, in the presence of one or more ligands L, with one or more chelated, promoter metal cations containing trivalent chromium of the general formula $(Cr_{1-z}M_zLX_y)^{2n+}$ for a time sufficient to precipitate said precursor from said solution. The chelated, water soluble trivalent chromium containing cation is formed under anhydrous conditions by dissolving a soluble salt of trivalent chromium in a mixture of one or more ligands, L, at low temperature, followed by heating said solution to a temperature sufficient to precipitate a chelated trivalent chromium cation and then contacting (if one or more promoter metals is desired in the catalyst), in aqueous solution, said so-formed chelated, trivalent chromium cation with one or more water soluble salts of chelated, divalent promoter metal. If only iron is desired as a promoter metal, the catalyst precursor can be formed by contacting an aqueous slurry of particles of hydrated oxide of trivalent chromium formed in situ from a soluble trivalent chromium salt or added as such with a water-soluble salt of divalent iron in the presence of one or more ligands, L and on or more soluble thiometallate salts of Mo, W or mixture thereof in the presence of a slurry of particles of one or more support materials. It should be noted that an excess of chromia will result in the formation of a catalyst composite wherein chromia forms the support or part thereof, depending on whether or not other support material is present.

As set forth above, the compositions of this invention will be formed by heating, at elevated temperature and in the presence of sulfur, a composite of inorganic refractory oxide support material and one or more precursor salt compounds wherein said precursor salt is selected from the group consisting of $(Cr_{1-z}M_zLX_y)(MoS_4)_n$, $(Cr_{1-z}M_zLX_y)(WS_4)_n$ wherein $n=(3-z-y)/2$ and mixture thereof wherein M is one or more divalent promoter metals selected from the group consisting of Mn, Fe, Co, Ni, Cu, Zn and mixtures thereof. Preferably M will be selected from the group consisting of divalent Fe, Ni, Co, Mn and mixtures thereof. In the above formulae, $1>z\geq 0$ and $1-z\geq y\geq 0$, L is one or more neutral nitrogen-containing ligands, at least one of which is a chelating polydentate ligand, and X is a singly charged anionic ligand. Thus, if no divalent promoter metal and no anionic ligand is present, n will be equal to 1.5. If one or more divalent promoter metal ions such as Ni, Fe, Co, etc. are present, then n will be less than 1.5 but will usually be greater than 1.0 due to the presence of the trivalent chromium ion, with the actual value of n depending on the relative amounts of trivalent chromium and divalent metal ions. In all cases where $y=1-z$ then $n=1$.

Thus, the catalyst precursor salt must contain trivalent chromium ($Cr^{3+}$) in addition to Mo, W or mixture thereof. If no divalent promoter metals are present, the precursor salt will have the formula $(CrL)(MoS_4)_{1.5}$ if molybdenum is present in the anion and $(CrL)(WS_4)_{1.5}$ if tungsten is present in the anion. Alternatively, the precursor salt may contain a divalent promoter metal or a mixture of two, three, four, five or even six promoter metals. For the case of one promoter metal, such as divalent metal $Co^{2+}$ and in the absence of an anionic ligand x (y=0), a molybdenum containing precursor salt will have the formula $((Cr_{1-z}Co_z)L)(MoS_4)_n$ wherein $0<z<1$. In the case of two promoter metals such as $Ni^{2+}$ and $Co^{2+}$, the precursor will have the formula of the form $((Cr_{1-z}Ni_{z'}Co_{z''})L)(MoS_4)_n$ wherein $z=z'+z''$, and $0<z<1$, etc. It is understood of course that a mixture of precursor salts may be used.

As defined above, ligand L will be one or more neutral, nitrogen containing ligands wherein at least one of said ligands is a multidentate chelating ligand, and ligand X is a singly charged anionic species. Ligands L and X coordinate to the metal cation to form a complex metal cation $(Cr_{1-z}M_zLX_y)^{2n+}$. Thus, for the case of i.e., molybdenum, the thiometallate anion $(MoS_4)^{2-}$ will be ionically bound to the above complex metal cation.

Those skilled in the art know that the term "ligand" is used to designate functional coordinating groups which have one or more pairs of electrons available for the formation of coordinate bonds. Ligands that can form more than one bond with a metal ion are called polydentate while ligands that can form only one bond with a metal ion are called monodentate. Monodentate ligands are not capable of forming chelates. Hence, if one uses one or more species of monodentate ligands in the precursor molecule, then one must also use at least one polydentate chelating ligand. Preferably L will be one or more polydentate chelating ligands. The total denticity of the ligand species comprising L will be sufficient to satisfy the coordination requirements of the promoter metals. This requirement will usually lead to a total denticity of six.

Thus, in the absence of any anionic ligands, i.e. when y=0, L will be three bidentate ligands, two tridentate ligands, a mixture of a bidentate and a quadridentate ligand, a hexadentate ligand or a mixture of a polydentate ligand with monodentate ligands as long as the combination has a total denticity of about six. As has heretofore been stated, it is preferred to use chelating bidentate and tridentate alkylamine ligands. In general, the ligands useful in this invention include alkyl and aryl amines and nitrogen heterocycles. Illustrative but non-limiting examples of ligands useful in the catalyst precursors of this invention are set forth below.

Monodentate ligands will include $NH_3$ as well as alkyl and aryl amines such as ethylamine, dimethyl amine, aniline and nitrogen heterocyclic amines such as pyridine, etc. Useful chelating bidentate amine ligand are illustrated by ethylenediamine, 2,2'-bipyridine, o- phenylene diamine, tetramethylethylenediamine and propane-1,3-diamine. Similarly, useful chelating tridentate amine ligands are represented by terpyridine and diethylenetriamine while triethylenetetramine is illustrative of a useful chelating quadridentate amine ligand. Useful chelating pentadentate ligands include tetraethylene pentamine while sepulchrate (an octazacryptate) is illustrative of a suitable chelating hexadentate ligand. As a practical matter it will be preferred to use chelating, polydentate alkyl amines for L. Illustrative, but not limiting examples or alkyl amines that are useful in the catalyst precursor of this invention include ethylenediamine (en), diethylenetriamine (dien), and tetraethylenetetramine. It is particularly preferred to use bidentate and tridentate alkyl amines such as ethylenediamine and diethylenetriamine.

As defined above, ligand X is a singly charged anionic species, such as $NO_2^-$, $OH^-$, etc. It is always present in conjunction with the neutral nitrogen-containing ligand L in amounts given by $1-z \geq y \geq 0$ in the general formula previously defined. Even when X is present, at least one of ligands L must be a chelating polydentate ligand. The sum of L and X must still satisfy the coordination requirement, usually six, of the promoter metals. Therefore, since y cannot exceed unity, the anionic ligand can at most satisfy one of the six coordination requirements of the promoter metal.

The value of y affects the Cr/Mo (or Cr/W) ratio in the precursor compound. Thus, when $y=1$, and there is no divalent promoter metal ($z=0$), the Cr/Mo ratio is 1/1. When $z \neq 0$, such as $z=0.5$, as will be the case if some Ni or Co, for example, are present, and if $y=0.5$, then the Cr/Mo ratio is $\frac{1}{2}$, etc.

Thus, it will be appreciated that because the value of n may vary between $1.5 \geq n \geq 1.0$ depending on (a) the amount, if any, of divalent promoter metal M present in the cation, and (b) the amount, if any, of the anionic ligand X, the theoretical ratio of the trivalent chromium plus promoter metal (if any) to molybdenum and tungsten in a composition of this invention formed from a single precursor salt species will vary, from 1/1 to 1/1.5.

Some of the precursor salts useful in forming the catalysts of this invention and methods for preparing them are known in the art although it has not heretofore been known that such salts can be useful catalyst precursors. An article by Diemann and Mueller titled "Thio and Seleno Compounds of the Transition Metals With $d^\circ$ Configuration" published in COORD. CHEM. REV. 10: 79-122 provides a review of some such known salts, including salts with neutral nitrogen containing ligands of type L, with combinations of ligands of type L and singly charged anionic ligands of the type X.

In general however, the precursor compounds useful for forming the compositions of this invention may be prepared by mixing a solution of an appropriate thiometallate such as ammonium thiomolybdate and/or thiotungstate in a mixture of ligand(s) L and water with an aqueous solution of the chelated promoter metal cation, containing trivalent chromium $(Cr_{1-z}M_zLX_y)^{2n+}$, which results in the formation of the precursor compound as a precipitate which is readily recovered. The chelated, trivalent chromium containing cation is formed under anhydrous conditions by dissolving a soluble salt of trivalent chromium, such as $CrCl_3$, in an appropriate ligand or ligand mixture at low temperature (i.e., 0° C.). When this solution is warmed up to, i.e., ambient temperature, the chelating reaction occurs and the chelated salt precipitates. The product can be filtered, washed with methanol and dried for subsequent use. The chelated divalent metal promoter cation is easily formed by, for example, mixing an aqueous solution of one or more water soluble promoter metal salts with the ligand. The water soluble salt may be any water soluble salt that is convenient to use such as a halide, sulfate, perchlorate, acetate, nitrate, etc. While the chelated salts are generally water soluble, they can be precipitated from their aqueous solutions by the addition of methanol, filtered and washed with methanol, and dried. For example, solid $Ni(en)_3Cl_2$ can be prepared by adding ethylenediamine (en) to an aqueous solution of $NiCl_2.6H_2O$, adding methanol to precipitate the chelate, washing with methanol and drying.

The anhydrously prepared chelated chromium cation salt is dissolved in water along with the chelated divalent promoter salt. The ammonium thiometallate solution is mixed with this solution containing the chelated promoters, resulting in the precipitation of the catalyst precursor salt. The precursor salt will preferably be formed in the presence of a slurry or colloidal suspension of support material. The precursor compound preparation will be further understood by reference to the Examples, infra.

The difference in the method of preparing the chelated chromium promoter cation from the chelated divalent metal promoter cations is the fact that chromium chelation is slow compared to that of the divalent ions. As a result, the addition of the basic ligand to an aqueous chromium salt solution will result in the formation predominantly of hydrated chromium oxide instead of the chelate $(CrL)Cl_3$. To avoid this hydrated oxide formation, the chromium chelation is carried out under anhydrous conditions by adding the trivalent chromium salt to the dry ligand. One can prepare the divalent promoter metal chelates in the same manner, either separately or along with the trivalent chromium chelates.

However, in an embodiment where the divalent promoter metal consists only of iron, it is not necessary to maintain anhydrous conditions during the addition of the ligand to the chromium salt solution. Thus, precursor salts useful for forming iron containing compositions of this invention may be prepared by mixing an aqueous slurry of (i) hydrated oxide of trivalent chromium $Cr(OH)_3.xH_2O$ with (ii) iron and ligand containing thiometallate salts and, optionally, (iii) one or more thiometallate salts containing the conjugate acid of one or more ligands (but no divalent promoter metal) precipitating the thiometallate salt onto the slurried particles of hydrated chromium oxide and recovering the precursor. The hydrated chromium oxide may be freshly precipitated from an aqueous solution of a trivalent chromium salt. Alternatively, the source of hydrated chromic oxide may be a colloidal, aqueous suspension of same. These materials are commercially available and have been found useful in forming the compositions of this invention. In one method of preparation, the hydrated chromium oxide will be precipitated from an aqueous solution of trivalent chromium salt by contacting said salt solution with one or more basic amine chelating agents. Again, however, these precursors are preferably formed in the presence of a suitable support material, including chromia or chromia coated materials in which case one will obtain a composite of support material and precursor.

The compositions or catalysts of this invention may be prepared by heating a composite of support material and one or more precursor salts in an oxygen-free environment, in the presence of sulfur, at a temperature of at least about 200° C. for a time sufficient to form the catalyst. Although the sulfur required during the formation of the catalyst may be present in the precursor, it is preferred that sulfur be present in an amount in excess of that contained in the precursor. Thus, it is preferred that the composition of this invention be formed by heating the precursor in the presence of sulfur or, preferably, in the presence of a sulfur bearing compound. Mixtures of hydrogen and $H_2S$ have been found to be particularly suitable. Preferably the temperature will range between from about 250°-600° C., more preferably from about 250°-500° C. and still more preferably from about 300°-400° C. The oxygen-free conditions may be gaseous, liquid or mixture thereof.

The compositions of the bulk, unsupported species of Jacobson et al corresponding to the supported species of this invention were established using a number of analytical techniques briefly described below.

X-ray diffraction (XRD) analysis was done by grinding a sample to fine powder and packing it into an alumina tray containing a cylindrical recess 25 mm in diameter and 1 mm in depth. The top surface of the sample was flat and co-planar with the top of the aluminum tray after this preparation. Measurements were made in ambient atmosphere using a Siemens D500 X-ray diffractometer in $\theta$–$2\theta$ reflection (Bragg-Brentano) geometry. The incident X-ray beam was taken from a fixed anode copper target with a wavelength of 1.54178 Å. The diffracted beams were monochromated using a graphite monochromator to minimize fluoresence and were detected using a proportional counter detector. Data were collected by stepping the detector in angular increments of 0.020°$2\theta$ and counting at each step for two seconds. The intensity and angular information were stored in a PDP 1103 computer and subsequently plotted as detected counts in 2 seconds versus $2\theta$.

The morphology and crystal structure determination of the constituent phases of the bulk, unsupported catalyst species of Jacobson, et al. were carried out using high resolution and analytical electron microscopy. In this procedure, described in P. C. Flynn et al., *J. Catal.*, 33, 233–248 (1974), the transition meal sulfide powder is prepared for the Transmission Electron Microscope (TEM) by crushing in an agate mortar and pestle to produce powder fragments through which an electron beam can pass. The crushed powder is ultrasonically dispersed in hexane and a drop of this suspension is allowed to dry onto a standard 3 mm TEM grid, which is covered with a thin ($\leq 200$ Å) amorphous carbon film. Samples were analyzed in a Philips 400T FEG TEM at 100 KV by bright field imaging, energy dispersive X-ray microanalysis, and microdiffraction.

Quantitative chemical analysis was obtained by the thin foil ratio method, as described in G. Cliff and G. W. Lovimer; J. Microscopy, 1975, Volume 103, Page 203, and absorption effects were analyzed and corrected using the procedure described by Goldstein, et al. in "Introduction to Analytical Electron Microscopy", J. J. Hren, J. I. Goldstein, and D. C. Joy eds, Plenum Press, New York, NY 1979, Page 83. X-ray fluorescent spectra was generated from the excited volume of a sample defined by a cylinder of 100 Å probe size and the thickness of the sample (typically 1000 Å).

An additional method used to evaluate the extent of dispersion and chemical state of the bulk, unsupported metal sulfide catalyst species of Jacobson et al. was EXAFS (Extended X-ray Absorption Fine Structure). EXAFS is an element-specific electron scattering technique in which a core electron ejected by an X-ray photon probes the local environment of the absorbing atom. The ejected photoelectron is backscattered by the neighboring atoms of the absorbing species and interferes constructively or destructively with the outgoing electron wave, depending on the energy of the photoelectron. The energy of the photoelectron is equal to the difference between the X-ray photon energy and a threshold energy associated with ejection of the electron. In the EXAFS experiment, the photoelectron energy is varied by varying the energy of the incident X-ray beam. The interference between outgoing and backscattered electron waves as a function of energy modulates the X-ray absorption coefficient so that the EXAFS function K.X(K) is observed experimentally as oscillations in the absorption coefficient ( ) on the high energy side of the absorption edges (c.f. Via et al., *J. Chem. Phys.*, 71, 690 (1979).

As discussed under Background of the Disclosure, molybdenum and tungsten sulfide catalysts have many uses, including hydrotreating. As shown in the following Table, hydrotreating conditions vary considerably depending on the nature of the hydrocarbon being hydrogenated, the nature of the impurities or contaminants to be reacted or removed, and, inter alia, the extent of conversion desired, if any. In general, however, the following are typical conditions for hydrotreating a naphtha boiling within a range of from about 25° C. to about 210° C., a diesel fuel boiling within a range of from about 170° C. to 350° C. a heavy gas oil boiling within a range of from about 325° C. to about 475° C., a lube oil feed boiling within a range of from about 290° to 550° C., or residuum containing from about 10 percent to about 50 percent of a material boiling above about 575° C.

| Typical Hydrotreating Conditions | | | | |
|---|---|---|---|---|
| Feed | Temp., °C. | Pressure psig | Space Velocity V/V/Hr | Hydrogen Gas Rate SCF/B |
| Naphtha | 100–370 | 150–800 | 0.5–10 | 100–2000 |
| Diesel Fuel | 200–400 | 250–1500 | 0.5–4 | 500–6000 |
| Heavy Gas Oil | 260–430 | 250–2500 | 0.3–2 | 1000–6000 |
| Lube Oil | 200–450 | 100–3000 | 0.2–5 | 100–10,000 |
| Residuum | 340–450 | 1000–5000 | 0.1–1 | 2000–10,000 |

It should be noted that the catalysts of this invention are also useful in lube oil refining processes where it is desirable to remove oxidation initiating nitrogen compounds from lube oil feeds.

The invention will be further understood by reference to the following examples.

EXAMPLES

EXAMPLE 1

Preparation of Catalyst Precursor A of Formula $(Cr(en)_3)(MoS_4)_{1.3}$

In this experiment, a catalyst precursor of the formula $[Cr(en)_3](MoS_4)_{1.3}$ was prepared according to the following procedure. First, $(Cr(en)_3)Cl_3$ was prepared under anhydrous conditions in order to avoid or minimize the formation of chromium hydroxide. Thus, 150 ml of ethylenediamine (en) was cooled to ice bath temperature. To this was added 20 g of anhydrous $CrCl_3$ in small aliquots, allowing each aliquot addition to be well mixed into the en before adding the next addition in order to prevent too much heat from being generated from the reaction of $CrCl_3$ with the en. After all the $CrCl_3$ had been added to the en, the mixture was warmed up to room temperature, which resulted in $(Cr(en)_3)Cl_3$ being formed as a yellow precipitate. In order to insure complete reaction, the slurry was continuously stirred for another four hours. The yellow product was filtered, thoroughly washed with methanol and dried at reduced pressure under dry nitrogen to yield approximately 42 grams of $(Cr(en)_3)Cl_3$ of 98 percent purity.

Thirty-four g of the yellow $[Cr(en)_3]Cl_3$ was then dissolved in 450 ml $H_2O$ which formed a cloudy solution. This solution was filtered in order to obtain a clear solution. Next, 25.7 g of $(NH_4)_2MoS_4$ was dissolved in 150 ml en and cooled in an ice bath. The $(Cr(en)_3)Cl_3$ solution was added to the $(NH_4)_2MoS_4$ solution with stirring which resulted in the formation of a bright, orange-red precipitate. The resulting slurry was stirred for an extra thirty minutes. The orange-red precursor product was filtered, washed with methanol and also dried at reduced pressure under nitrogen to yield 41 grams of the Precursor A having the general formula $(Cr(en)_{3-y/2}(OH)_y)(MoS_4)_{(3-y)/2}$ where y is approximately 0.5. Elemental analysis of the catalyst precursor product are set forth in the table below.

EXAMPLE 2

Preparation of Catalyst Precursor B of Formula $(Cr(en)_3)(MoS_4)_{1.6}$

Because the atomic ratio of Cr to Mo was not 1/1.5, another batch of precursor, Precursor B was made using a sample of recrystallized $(Cr(en)_3)Cl_3$. Precursor B on elemental analysis was found to have a chrome to molybdenum ratio of slightly higher than 1/1.5, but within the experimental error of the analysis. These results are also set forth in the table below.

|  | Cr | Mo | S | N | C | H | O | Mo/Cr |
|---|---|---|---|---|---|---|---|---|
| Precursor A | 9.6 | 22.4 | 30.5 | 15.8 | 13.7 | 5.0 | 3.1 | 1.3 ± .1 |
| Precursor B | 8.4 | 24.8 | 33.6 | 14.7 | 12.6 | 4.2 | 1.9 | 1.6 ± .1 |

An infrared spectrum of Precursor A did not show a characteristic absorption near 1600 $cm^{-1}$ which would have indicated the presence of water of hydration. Instead, there were some peaks below 1200 $cm^{-1}$ which could have been due to hydroxy complexes as expressed in the above general formula, and as indicated by the presence of oxygen in the elemental analysis. Kazuo Nakamoto in "Infrared and Raman Spectro of Inorganic and Coordination Compounds", J. Wiley & Sons, 1978 states on p. 229 that "the hydroxy group can be distinguished from the aquo group since the former lacks the HOH bending mode near 1600 $cm^{-1}$ [ . . . in the infrared spectrum . . . ]. Furthermore, the hydroxy complex exhibits the MOH bending mode below 1200 $cm^{-1}$."

EXAMPLE 3

Preparation of Catalyst Precursor C $(Cr_{0.5}Fe_{0.5}(en)_3)$-$(MoS_4)_{1.25}$

In another experiment, a catalyst precursor (Precursor C) of the formula $(Cr_{0.5}Fe_{0.5}(en)_3)(MoS_4)_{1.25}$ was prepared by the following procedure. First, the amine thiomolybdate of ethylenediamine (en) was prepared by dissolving 31.3 g of $(NH_4)_2MoS_4$ in 100 ml of en which had been degassed with nitrogen and cooled in an ice bath. From this point on, all operations were carried out under $N_2$ except during the work-up of the product. $(Cr(en)_3)Cl_3$, as prepared above, was dissolved in water and filtered to produce 150 ml of solution containing 16.4 g of the chelated salt. To this solution, 9.64 g of $FeCl_2.4H_2O$ was added, resulting in a brownish suspension. This suspension was slowly added to the cooled $(NH_4)_2MoS_4$ solution with vigorous agitation. Thirty minutes after addition was complete, the orange-red precipitated product was filtered under anaerobic conditions. It was washed with a mixture of 200 ml $H_2O$ and 20 ml en, followed by 3 washes of methanol, 200 ml each and dried by vacuum suction under $N_2$ overnight. The yield of Precursor C was approximately 45 g.

EXAMPLE 4

Preparation of Catalyst Precursor D $(Cr_{0.5}Ni_{0.5}(en)_3)$-$(MoS_4)_{1.25}$

In the following experiement, a nickel containing catalyst precursor (Precursor D) of the formula $[Cr_{0.5}Ni_{0.5}(en)_3](MoS_4)_{1.25}$ was prepared according to the following procedure. First, 31.38 g. of $(NH_4)_2MoS_4$ was dissolved in 100 ml degassed en and cooled in an ice bath. Previously prepared $(Cr(en)_3)Cl_3$ (16.4 g) and 16.7 g of $(Ni(en)_3)Cl_2$, synthesized in the conventional manner by methanol precipitation from an aqueous solution of $NiCl_2.6H_2O$ to which en had been added, were dissolved in a mixture of 150 ml water and 5 ml en. This solution was filtered. The clear filtrate was added dropwise to the $(NH_4)_2MoS_4$ solution with vigorous agitation. A red-orange precipitate formed. After addition was completed, the red-orange product was filtered. It was washed with a mixture of 450 ml $H_2O$ and 60 ml en in 3 washes, followed by a 300 ml methanol wash, and a 100 ml diethylether wash. After vacuum drying, the yield of Precursor D was approximately 45 g.

EXAMPLE 5

Preparation of Another Chromium-Iron Thiomolybdate Catalyst Precursor E

A chromium-iron thiomolybdate catalyst precursor was prepared by dissolving 40 gm of $(NH_4)_2MoS_4$ into 86 ml of ethylenediamine (en) in a one liter flask. Distilled $H_2O$ was used twice to wash off any solution remaining on the sides of the flask. The resulting dark red solution was cooled to 0° C. in a wet ice bath and kept in the bath for the duration of the experiment. In a separate flask a mixture of 16.52 gm $CrCl_3.6H_2O$ and 12.36 gm $FeCl_2.4H_2O$ was dissolved into 250 ml of distilled water and 25 ml of ethylenediamine was added which formed a precipitate. This slurry was then allowed to stand for 2–3 hours after which it was added dropwise, to the aqueous $(NH_4)_2MoS_4$/en solution with agitation. An orange precipitate formed and the mixture was stirred in the ice bath for one half hour after the additon was completed. The precipitate was separated out by vacuum filtration, washed with ethanol and dried under vacuum for 16–24 hrs. at room temperature. Seventy-nine grams of precipitate, Precursor E, were recovered.

EXAMPLE 6

Preparation of Another Fe-Cr Thiomolybdate Catalyst Precursor F

Another chromium-iron promoted thiomolybdate catalyst precursor was prepared in a similar manner by dissolving 40 grams of $(NH_4)_2MoS_4$ in 82 ml of diethylenetriamine (dien) in a 1 liter flask. Distilled water was used to wash off any solution remainng on the sides of the flask and the resulting dark red solution was cooled to 0° C. in a wet ice bath and kept in the bath for the duration of the experiment. In a separate flask a mixture of 12.36 grams of $FeCl_2.4H_2O$ and 16.52 grams of $CrCl_3.6H_2O$ were dissolved in 250 ml of distilled water and 25 ml of diethylenetriamine was added to form a precipitate. This slurry was allowed to stand for 2-3 hours after which it was added dropwise to the $(NH_4)_2MoS_4$/dien solution with agitation. A bright orange precipitate formed. The resulting precipitate/solution was stirred in the ice bath for a half hour after the reaction was completed. The precipitate was then separated by vacuum filtration and washed with water and ethanol and then dried under vacuum. Eighty-three grams of orange colored precipitate, Precursor F, were recovered.

EXAMPLE 7

Preparation of Catalyst Precursor G Using Excess Colloidal Chromia

A catalyst precursor containing iron, molybdenum and chromium was prepared according to the following procedure employing excess amounts of chromia.

An aqueous chromia sol was obtained from Nyacol containing 22 wt.% of $Cr_2O_3$ particles having an average particle size of about 50 Å. An 80.7 gm sample of this sol (containing 0.117 mole $Cr_2O_3$) was added to a large three-neck, round-bottom flask, and diluted to a total volume of 400 ml with deionized water. To this colloidal suspension was added 11.5 gms of (0.029 mole) of $Fe(NH_4)_2(SO_4)_2.6H_2O$ dissolved in 50 ml. of deionized water. Upon addition of the ferrous ammonium sulfate solution, the colloidal chromia gelled. The gel was vigorously stirred by means of an air-driven stirrer. At this point, 7.6 gms. (0.029 mole) of ammonium thiomolybdate ($(NH_4)_2MoS_4$) dissolved in a mixture of 25 ml. ethylenediamine and 100 ml. water was slowly added to the stirred gel. This caused the formation of a precursor of a composition of this invention which was a brown-back precipitate of trisethylenediamine iron (II) thiomolybdate admixed with the chromia. Thus, the flask contained iron, molybdenum and chromium, respectively, in the atomic ratios of 1:1:8. The precursor precipitate was recovered by vacuum filtration and dried in vacuum at 50° C. for 24 hours, yielding Precusor G containing about 50% $Cr_2O_3$.

EXAMPLE 8

Preparation of Supported Catalyst Precusor H

In this experiment, an iron promoted chromium-molybdenum catalyst precursor supported on silica was prepared. Colloidal silica, 49.7 gms, containing 34 wt.% $SiO_2$ was put into a large flask and diluted with deionized water to 400 ml. An aqueous solution of 5.4 g $Fe(NH_4)_2(SO_4)_2.6H_2O$ and 5.5 g $Cr(NO_3)_3.9H_2O$ in 50 ml water was added to the above suspension with stirring. A solution of 8.9 g of $(NH_4)_2MoS_4$ in 100 ml $H_2O$ and 25 ml of en was then added, dropwise, to the flask with vigorous stirring. The resultant precipitate was filtered, washed and dried to yield 31 g of Precursor H.

EXAMPLE 9

Catalyst Preparation

For these experiments, the catalyst precursors of Experiments 1-8 were pelletized using a 4% aqueous solution of polyvinyl alcohol as a binder and then were placed into a stainless steel reactor, heated to 100° C. at atmospheric pressure and purged for one hour with nitrogen. Ten percent of hydrogen sulfide in hydrogen was introduced into the reactor at a rate of 0.75 SCF/hr for each 10 cc of catalyst in the reactor. The temperature in the reactor was then raised to 325° C. and kept at this temperature for three hours to form the catalyst after which the termperature in the reactor was lowered to 100° C., the $H_2S/H_2$ gas flow was stopped and the reactor was purged with nitrogen until room temperature was reached.

EXAMPLE 10

Characterization of Catalyst Derived From Catalyst Precursor A (Example 1)

X-ray diffraction analysis of the catalyst composition derived from catalyst precursor A revealed no evidence of any crystalline phases. Particularly, there was no "002" peak near $2\theta=12°$ which would indicate multilayer stacking typical of molybdenum sulfide-like compositions. This finding corroborates the evidence of the HREM micrograph, to be discussed below. X-ray diffraction analysis of catalyst compositions obtained from Precursors C and D also showed no evidence of crystallinity or the presence of molybdenum sulfide-like layer material which would give rise to a (002) peak.

An X-ray diffractions pattern was also run on the lined out chromium/molybdenum sulfide catalyst derived from Precursor A. The data indicated little crystallinity and a small indication of a 002 peak between $2\theta$ values of 10 and 15°, indicative of some molybdenum sulfide-like layer formation.

The catalyst derived from precursor A was examined and analyzed by HREM and was found to be amorphous. Chemical analysis carried out in the electron microscope indicated a chemically homogeneous single phase within the 100 Å spatial resolution of the analysis. The chemical composition was determined. as a 1/1 ratio of Cr/Mo within the ±20% precision of the technique.

Some double lines were found in the electron photomicrographs which, while not wishing to be held to any particular theory, are believed to have been very tiny crystallites or crystal materials about 6 Å thick of a molybdenum sulfide-like phase. The absence of any observable crystallinity using this HREM technique implies that if crystallites do exist in the bulk, amorphous material, then they must be less than about 15 Å thick in their largest dimension, due to the fact that this is about the limit of detectability using the HREM method. Again, while not wishing to be held to any particular theory, it is believed that small, plate-like crystallites of a general molybdenum sulfide structure may exist within the bulk amorphous material. It should be known that even if the bulk, amorphous material were completely composed of tiny, small plate-like crystallites, such a composition would still appear to be amorphous when analyzed by HREM using the present resolution. Thus, whether a material is crystalline or amorphous and, if so to what extent, can be and sometimes is a matter both of definition and of the technique or techniques used to measure crystallinity.

EXAFS data of the chromium/molybdenum composition derived from Precursor A indicated that the amorphous structure of the composition extends down to the local atomic structure with no detectable phase separation.

EXAMPLE 11

Chemical analyses were run on the catalyst compositions derived from the Precursors A, F and G. The results of these analyses for A and F are shown in the Table below.

| Elemental Analysis (wt. %) of Compositions Derived From Precursors A and F | | | | | | | |
|---|---|---|---|---|---|---|---|
| Precursor | Cr | Fe | Mo | N | C | H | S |
| A | 14.40 | — | 34.10 | 2.55 | 4.44 | 1.32 | |
| F | 5.07 | 10.63 | 21.81 | 5.07 | 9.59 | 1.73 | 26.31 |

The catalyst prepared from Precursor G (Example 7) gave the following elemental analysis: Fe, 3.03 wt.%; Mo, 5.09; Cr, 23.0. This yields an Fe/Mo/Cr atomic ratio of 1.0/0.98/8.1.

X-ray diffraction analysis of catalysts prepared from precursors E and F revealed no evidence of any crystalline phases.

EXAMPLE 12

Catalyst Evaluation

The catalysts were loaded into a fixed-bed reactor. The conditions in the reactor were as set forth below:
Temperature 325° C.
Pressure 3.15 MPa, 6.0 MPa
Hydrogen Rate 3000 SCF/bbl
LHSV 3.0 V/V/Hr The liquid product was analyzed for total sulfur by X-ray fluorescence and for nitrogen by combustion analysis. The feedstock used was a light catalytic cycle oil (LCCO) that was about 20 wt.% paraffinic having properties set forth in Table 1.

In all of these experiments, the results obtained from the catalysts of this invention were compared to results obtained from a commercial hydrotreating catalyst precursor comprising nickel molybdate on $\gamma$—$Al_2O_3$. This material contained 18 percent molybdenum oxide and 3.5 percent nickel oxide supported on a gamma alumina. These commercial precursors were sulfided employing the same procedure used to form the catalysts of this invention, except that the temperature was held at 360° C. for one hour.

The results of these experiments are shown in Tables 2 through 8 and show that the catalysts of this invention are not only useful hydrotreating catalysts but have higher selectivity for hydrodenitrogenation than the commercial nickel molybdate on alumina catalyst.

TABLE 1

| LCCO Feed | |
|---|---|
| Gravity (°API) | 18.6 |
| Sulfur, wt. % | 1.4 |
| Nitrogen, ppm | 292 |
| GC Distillation | |
| Wt. % | Temp., °C. |
| 5 | 231 |
| 10 | 251 |
| 50 | 293 |
| 70 | 321 |

TABLE 1-continued

| | |
|---|---|
| 90 | 352 |
| 95 | 364 |

TABLE 2

Hydrotreating Activity for Catalyst Derived from Commercial Nickel Molybdate on Alumina, at 3.15 MPa

| Catalyst Hours On Stream | % HDS | % HDN |
|---|---|---|
| 49 | 80.0 | 32.3 |
| 71 | 80.8 | 38.6 |
| 75 | 80.0 | 37.6 |

TABLE 3

Hydrotreating Activity for Catalyst Composition Derived From Precursor A, at 3.15 MPa

| Catalyst Hours on Stream | % HDS | % HDN |
|---|---|---|
| 41 | 35.1 | 46.9 |
| 62 | 39.6 | 48.0 |
| 109 | 42.3 | 54.2 |

TABLE 4

Hydrotreating Activity for Catalyst Composition Derived From Precursor C

| Catalyst Hours on Stream | Reactor Pressure MPa | % HDS | % HDN |
|---|---|---|---|
| 23 | 3.15 | 31.6 | 33 |
| 44 | 6.0 | 38.2 | 54.2 |

TABLE 5

Hydrotreating Activity for Catalyst Composition Derived From Precursor D

| Catalyst Hours on Stream | Reactor Pressure MPa | % HDS | % HDN |
|---|---|---|---|
| 23 | 6.0 | 87.5 | 94.5 |

TABLE 6

Hydrotreating Activity For Catalyst Prepared From Chromium-Iron Promoted Thiomolybdate Precursor F Prepared With Diethylenetriamine*

| Catalyst Hours on Stream | % HDS | % HDN |
|---|---|---|
| 42 | 55.9 | 83.5 |
| 46 | 56.2 | 83.5 |

*LSHV 4.0

A 13 cc sample of catalyst derived from Precursor G (Example 7) was used to hydrotreat the LCCO feed at a LHSV of 3.0 over a period of 120 hrs. The second order hydrodesulfurization ($K_{HDS}$) and the first order hydrodenitrogenation ($K_{HDN}$) rate constants for this catalyst were calculated to be $K_{HDS}$=2.7 and $K_{HDN}$=4.0. The HDN selectivity ($K_{HDN}/K_{HDS}$) was therefore 1.5.

At the same conditions, the $K_{HDS}$, $K_{HDN}$ and $K_{HDN}/K_{HDS}$ obtained using the commercial nickel molydate on alumina catalyst were 12.2, 1.29 and 0.1, respectively.

The hydrodenitrogenation activity, per unit of active (Mo) metal content, of the excess chromia supported Fe—Cr—Mo sulfide catalyst derived from Precursor G was the highest of any supported catalyst species tested. It was also better than that of comparable Cr—Mo sulfide, Ni—Mo sulfide, Ni—W sulfide, Mn—Mo sulfide catalysts supported on chromia, and far superior to that of the above species supported on other inorganic refractory oxide carriers like silica, alumina or iron oxide.

A sample of catalyst derived from Precursor H (Example 8) was run on LCCO. This gave a second order hydrodesulfurization rate constant of 1.37 and a first order hydrodesulfurization rate constant of 0.14.

EXAMPLE 13

Comparative Example

In this experiment, a chromium-promoted molybdenum sulfide on alumina catalyst was prepared using the procedure set forth in Example 4 of U.S. Pat. No. 3,265,615. Thus, 24.2 grams of $(NH_4)_6Mo_7O_{24}.4H_2O$ (APM) were dissolved in 150 ml of water. One-half of this solution was used to impregnate 26.6 grams of a reforming grade $\gamma$—$Al_2O_3$ that had been calcined to remove water. The impregnate was dried overnight at 100° C. and reimpregnated with the other half of the APM solution. The resulting impregnate was again dried overnight at 100° C. and then calcined in air for four hours at 550° C. To the calcined impregnate was added a hot (80°–100° C.) solution of 20 g of $Cr_2(SO_4)_3$ in 50 ml of water, followed by drying overnight at 100° C. to form 58.7 g of a green colored, chromium-promoted molybdate precursor. This precursor was then pelletized and screened to 20 to +40 mesh.

The screened precursor was placed in the reactor and contacted with flowing hydrogen at room temperature. The temperature was then raised to 288° C. and held there for one-half hour, followed by raising the temperature to 450° C., holding for one-half hour and then raised to 510° C. and held at 510° C. for one-half hour. The reactor temperature was then lowered to 316° C., and the hydrogen replaced with a 10% $H_2S$ in $H_2$ mixture. The flowing $H_2S/H_2$ mixture contacted the precursor for three hours at 316° C. The LCCO feed was then introduced employing the procedure set forth above, except that the LHSV was 3.0 V/V/hr. The results are set forth below in Table 7.

TABLE 7

| Catalyst Hours on Stream | % HDS | % HDN |
| --- | --- | --- |
| 48 | 23.8 | 5.8 |
| 70 | 24.4 | 5.2 |

These results are much different from the results obtained for a chromium-promoted molybdenum sulfide catalyst of this invention employing the same feed and reaction conditions set forth in Table 3. Thus, the chromium promoted catalyst of this invention is much superior in both HDS and HDN activity to the chromium promoted catalyst disclosed and claimed in U.S. Pat. No. 3,265,615. These comparative results also established that the catalyst of this invention is a different catalyst from that of U.S. Pat. No. 3,265,615.

EXAMPLE 14

Preparation of Precursor I and Catalyst Therefrom 174.8 g of a 22 wt.% aqueous suspension of colloidal $Cr_2O_3$ containing 38.46 g of $Cr_2O_3$ (0.25 m $Cr_2O_3$), was placed into a 2000 ml round-bottom flask provided with an electric stirrer, and diluted to 400 ml with distilled water. 15.66 g of $(NH_4)_2MoS_4$ (0.06 m) was dissolved in a mixture of 100 ml $H_2O$ and 50 ml ethylenediamine (en) in an ice bath, and the resulting solution was slowly added to the colloidal $Cr_2O_3$ suspension with rapid agitation. Some gel formed, which was broken up with a spatula, and a small quantity of additional water was added to the system. After the thiomolybdate addition was completed, 16.18 g of $Cr(en)_3Cl_3.3.5H_2O$ (0.04 m) dissolved in 50 ml water was added to the round-bottom flask. The slurry turned bright orange. Stirring was continued for 15 more minutes, after which the mixture was filtered and washed with water. The solid was dried in a vacuum at 50° C., and a sample of the filter cake was ground and sieved to 20/40 mesh. Analysis of the catalyst precursor (Precursor I) showed 25.0 wt.% Cr, 4.94 wt.% Mo, or a Mo/Cr atomic ratio of 1/9.3.

Sulfiding of the precursor was done for three hours at 325° C. with a ten percent $H_2S$ in $H_2$ mixture.

Evaluation of the resultant composition as a catalyst was carried out in an automated, continuous stirred tank reactor unit consisting of a one liter autoclave, calibrated feed burette, pump, gas-liquid separator, and product liquid collector. In a typical experiment, 20 cc of catalyst were charged in a stainless steel basket which was placed inside the autoclave.

Operating conditions and hydrotreating results are listed in Table 8.

TABLE 8

| Operating Conditions and Hydrotreating Results | |
| --- | --- |
| Feed | LCCO |
| Properties | See Table 1 |
| Temperature, °C. | 325 |
| Pressure, MPa | 3.15 |
| Hydrogen Rate, SCF/bbl | 3000 |
| Space Velocity,, V/V/hr | 1 |
| % HDS | 26.8 |
| % HDN | 29.9 |

What is claimed is:

1. As a composition of matter, a supported hydroprocessing catalyst obtained by compositing a quantity of a particulate, porous catalyst support material comprising one or more refractory oxides with one or more catalyst precursor salts and heating said composite at an elevated temperature of at least about 200° C. up to about 600° C., in the presence of a sulfur-bearing compound in an amount such that, based on the sulfur in said sulfur-bearing compound, sulfur is present in excess of that contained in the catalyst precursor and under oxygen-free conditions for a time sufficient to form said catalyst, wherein said catalyst precursor salt contains a tetrathiometallate anion of Mo, W or mixture thereof and a cation comprising trivalent chromium or mixture of trivalent chromium with one or more divalent promoter metals selected from the group consisting of Fe, Ni, Co, Mn, Zn, Cu and mixture thereof wherein said trivalent chromium and divalent promoter metals are chelated by at least one neutral, nitrogen-containing polydentate ligand, L, and wherein said trivalent chromium and divalent promoter metal are in the same or different cations.

2. The catalyst of claim 1 containing at least one of said promoter metals.

3. The catalyst of calim 2 wherein ligand L is selected form the group consisting of bidentate and tridentate alkyl amines, aryl amines, nitrogen heterocycles and mixtures thereof.

4. The catalyst of claim 3 wherein said support material consists of one refractory inorganic oxide.

5. The catalyst of claim 4 wherein ligand L is an alkyl amine.

6. The catalyst of claim 5 wherein said non-oxidizing atmosphere comprises a mixture of $H_2$ and $H_2S$.

7. A process for preparing a supported hydroprocessing catalyst, said process comprising compositing a quantity of a particulate, porous catalyst support material comprising one or more refractory oxides with one or more catalyst precursor salts and heating said composite at elevated temperature of at least about 200° C. up to about 600°, in the presence of a sulfur-bearing compound in an amount whereby sulfur in the form of said sulfur-bearing compound is present in excess of that contained in the catalyst precursor and under oxygen-free conditions for a time sufficient to form said catalyst, wherein said catalyst precursor salt contains a tetrathiometallate anion of Mo, W or mixture thereof and a cation comprising trivalent chromium or a mixture of trivalent chromium with one or more divalent promoter metals selected from the group consisting of Fe, Ni, Co, Mn, Zn, Cu and mixture thereof wherein said trivalent chromium and divalent promoter metals are chelated by at least one neutral, nitrogen-containing polydentate ligand, L.

8. The process of claim 7 containing at least one of said promoter metals.

9. The process of claim 8 wherein ligand L is selected from the group consisting of bidentate and tridentate alkyl amines, aryl amines, nitrogen heterocycles and mixtures thereof.

10. The process of claim 9 wherein said support material consists of one refractory inorganic oxide.

11. The process of claim 10 wherein ligand L is an alkyl amine.

12. The process of claim 11 wherein said non-oxidizing atmosphere comprises a mixture of $H_2$ and $H_2S$.

13. As a composition of matter, a supported hydroprocessing catalyst obtained by compositing a quantity of inorganic refractory oxide support material with one or more catalyst precursor salts and heating said composite at an elevated temperature of at least about 200° C. up to about 600° C. in the presence of a sulfur-bearing compound in an amount such that the sulfur in the form of said sulfur-bearing compound is present in excess of that present in said precursor and under oxygen-free conditions for a time sufficient to form said catalyst, wherein said presursor salt is selected from the group consisting of $(Cr_{1-z}M_zLX_y)$ $(MoS_4)_n$, $(Cr_{1-z}M_zLX_y)$ $(WS_4)_n$ and mixture thereof, wherein the chromium is in the trivalent state, wherein $n=(3-z-y)/2$, wherein M is one or more divalent promoter metals selected from the group consisting of Mn, Fe, Co, Ni, Cu, Zn and mixtures thereof, wherein $1 \geq z \geq 0$ and $1-z \geq y \geq 0$, wherein ligand L is one or more neutral, nitrogen-containing ligands, at least one of which is a chelating polydentate ligand, and wherein X is a single charged anionic ligand.

14. The catalyst of claim 13 wherein ligand L is selected from the group consisting of alkyl amines, aryl amines, nitrogen heterocycles and mixtures thereof.

15. A process for preparing a supported hydroprocessing catalyst, said process comprising compositing a quantity of inorganic refractory oxide support material with one or more catalyst precursor salts and heating said composite at elevated temperature of at least about 200° C. up to about 600° C., in the presence of sulfur in the form of a sulfur-bearing compound wherein said sulfur is present in an amount in excess of that contained in said precursor salt and under oxygen-free conditions for a time sufficient to form said catalyst, wherein said precursor salt is selected from the group consisting of $(Cr_{1-z}M_zLX_y)$ $(MoS_4)_n$, $(Cr_{1-z}M_zLX_y)$ $(WS_4)_n$ and mixture thereof, wherein the chromium is in the trivalent state, wherein $n=(3-z-y)/2$, wherein M is one or move divalent promoter metals selected from the group consisting of Mn, Fe, Co, Ni, Cu, Zn and mixtures thereof, wherein $1 \geq z \geq 0$ and $1-z \geq y \geq 0$, wherein ligand L is one or more neutral, nitrogen-containing ligands, at least one of which is a chelating polydentate ligand, and wherein X is a single charged anionic ligand.

16. The process of claim 15 wherein said precursor salt is formed in the presence of a slurry of particles of support material by mixing an aqueous solution of (a) a compound or mixture of compounds having the thiometallate anion of Mo or W with (b) one or more ligands, at least one of which is a chelating polydentate ligand, and (c) an aqueous solution with a trivalent chromium containing cation, $(Cr_{1-z}M_zLX_y)^{2n+}$.

17. The process of either of claims 15 or 16 wherein ligand L is selected from the group consisting of alkyl amines, aryl amines, nitrogen heterocycles and mixtures thereof.

* * * * *